US011857500B2

(12) United States Patent
Van Der Kooi et al.

(10) Patent No.: US 11,857,500 B2
(45) Date of Patent: Jan. 2, 2024

(54) TEAT FOR USE WITH A CONTAINER FOR CONTAINING A FLUID

(71) Applicant: KONINKLIJKE PHILIPS N.V., Eindhoven (NL)

(72) Inventors: Johannes Tseard Van Der Kooi, Munein (NL); Jacob Cornelis Paul Den Dulk, Eindhoven (NL); Narasimha Shastri, Eindhoven (NL)

(73) Assignee: KONINKLUKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/567,312

(22) Filed: Jan. 3, 2022

(65) Prior Publication Data

US 2022/0117852 A1 Apr. 21, 2022

Related U.S. Application Data

(63) Continuation of application No. 16/603,602, filed as application No. PCT/EP2018/058377 on Apr. 2, 2018, now Pat. No. 11,241,366.

(30) Foreign Application Priority Data

Apr. 10, 2017 (EP) .................................... 17165791

(51) Int. Cl.
*A61J 11/00* (2006.01)

(52) U.S. Cl.
CPC .......... *A61J 11/002* (2013.01); *A61J 11/0035* (2013.01); *A61J 11/0065* (2013.01)

(58) Field of Classification Search
CPC .... A61J 11/002; A61J 11/001; A61J 11/0035; A61J 11/0065
See application file for complete search history.

(56) References Cited

U.S. PATENT DOCUMENTS 721,722 A * 3/1903 Morton .................. A61J 11/002
215/11.4
1,366,727 A * 1/1921 Gerstner .............. A61J 11/0065
215/11.1

(Continued)

FOREIGN PATENT DOCUMENTS

EP 1354579 10/2003
WO 02/22073 3/2002

(Continued)

OTHER PUBLICATIONS

International Search Report and Written Opinion dated Jun. 15, 2018 for International Application No. PCT/EP2018/058377 filed Apr. 2, 2018.

*Primary Examiner* — John K Fristoe, Jr.
*Assistant Examiner* — Jennifer Castriotta

(57) ABSTRACT

A teat for use with a fluid container comprises a deformable mouthpiece for an infant to suck on during a fluid intake action and an inner core disposed within the mouthpiece. An exterior surface of the inner core is spaced from an interior surface of the mouthpiece at the position of a fluid pocket guiding face of the exterior surface of the inner core so that a fluid duct between the mouthpiece and the inner core is defined which allows the infant to perform a peristaltic fluid intake action. At least one of the interior surface of the mouthpiece and the exterior surface of the inner core has at least one protrusion that is designed to form a fluid barrier between the mouthpiece and the inner core at a position for delimiting the fluid duct at the sides thereof.

18 Claims, 3 Drawing Sheets

(56) References Cited

U.S. PATENT DOCUMENTS

| | | | | | |
|---|---|---|---|---|---|
| 1,465,748 | A * | 8/1923 | Weld | A61J 11/0065 | 215/11.1 |
| 2,584,359 | A | 2/1952 | Miles | | |
| 2,623,524 | A * | 12/1952 | Clemens | A61J 11/002 | 215/11.4 |
| 5,478,325 | A * | 12/1995 | Fu-Hsiang | A61J 11/0065 | 215/11.1 |
| 5,578,004 | A * | 11/1996 | Liang | A61M 31/00 | 606/236 |
| 5,791,503 | A * | 8/1998 | Lyons | A61J 9/00 | 215/11.4 |
| 7,204,380 | B2 * | 4/2007 | Webb | A47G 19/2272 | 215/11.4 |
| 7,210,591 | B2 | 5/2007 | Goldman | | |
| 8,910,809 | B2 | 12/2014 | Fischer | | |
| 9,161,886 | B2 | 10/2015 | Haberman | | |
| 2009/0139950 | A1 * | 6/2009 | Greter | A61J 11/04 | 215/11.5 |
| 2011/0100944 | A1 | 5/2011 | Van Der Kooi | | |

FOREIGN PATENT DOCUMENTS

| | | |
|---|---|---|
| WO | 2007/137440 | 12/2007 |
| WO | 2010/004487 | 1/2010 |

* cited by examiner

TEAT FOR USE WITH A CONTAINER FOR CONTAINING A FLUID

CROSS REFERENCE TO RELATED APPLICATIONS

This application is a continuation of U.S. application Ser. No. 16/603,602 filed Oct. 8, 2019, published as US 2021/0085568 on Mar. 25, 2021, which is the U.S. National Phase application under 35 U.S.C. § 371 of International Application No. PCT/EP2018/058377 filed Apr. 2, 2018, published as WO 2018/188980 on Oct. 18, 2018, which claims the benefit of European Patent Application No. 17165791.9 filed Apr. 10, 2017. These applications are hereby incorporated by reference herein.

FIELD OF THE INVENTION

The invention relates to a teat for use with a container for containing a fluid, comprising: a deformable mouthpiece for an infant to suck on during a fluid intake action, the mouthpiece having at least one aperture therein for allowing a fluid to flow out of the teat; and an inner core disposed within the mouthpiece, wherein an exterior surface of the inner core is spaced from an interior surface of the mouthpiece at the position of a fluid pocket guiding face of the exterior surface of the inner core extending along a length of the inner core so that a fluid duct between the mouthpiece and the inner core is defined which allows the infant to perform a peristaltic fluid intake action during which the mouthpiece is deformed and a fluid is forced along the fluid duct in a direction towards the at least one aperture of the mouthpiece.

The invention furthermore relates to an assembly comprising a teat as mentioned and a container for containing a fluid. Such an assembly may be a feeding bottle assembly comprising a feeding bottle for containing a feeding fluid such as milk, for example.

BACKGROUND OF THE INVENTION

A teat as defined in the foregoing is known from WO 2010/004487 A1. The design of the teat is aimed at rewarding an infant for making a natural peristaltic tongue movement that is normally only related to breast feeding. In general, the teat is configured to allow an infant to realize a flow of fluid from the teat under the influence of the natural peristaltic tongue movement as mentioned. As an advantageous consequence, there is no need for the infant to develop another fluid intake action than a natural breast-feeding action, so that problems which might otherwise occur when switching between bottle feeding and breast feeding are prevented.

The teat known from WO 2010/004487 A1 has a mouthpiece on which an infant sucks during a fluid intake action, particularly a feeding action. The mouthpiece extends from a main body and has one or more apertures therein for a flow of fluid out of the teat. A well-known example of a fluid used for feeding purposes is milk. Furthermore, the teat has an inner core that is disposed within the mouthpiece in such a way that a fluid duct is defined between the inner core and the mouthpiece. During fluid intake, at least one of the inner core and the mouthpiece deforms so as to allow for a peristaltic action which causes fluid to flow along the fluid duct and eventually out of the teat through the at least one aperture of the mouthpiece. The teat is configured so that the peristaltic action provides the infant with the most amount of fluid, compared to if the infant was to use a sucking or a chewing action. In this way, the infant is rewarded for using the same fluid intake action as with natural breast feeding.

Various embodiments of the known teat are disclosed in WO 2010/004487 A1. In a number of those embodiments, the exterior surface is provided with an arced face or recess that extends along a length of the inner core, so that space is present between the inner core and the mouthpiece at the position of the arced face or recess of the exterior surface of the inner core. In such a configuration, a fluid duct is defined between the mouthpiece and the inner core at the position of the arced face or recess of the exterior surface of the inner core.

SUMMARY OF THE INVENTION

Although the known teat functions well and achieves the advantageous effects as described in the foregoing, there is room for improvement of the design of the teat. It is an object of the invention to provide a teat of the type known from WO 2010/004487 A1 and to design the teat in such a way that prevention of back flow of fluid is improved. The functionality of the teat depends upon the infant being allowed to form a pocket filled with fluid in the teat that it can compress to force the fluid out of the teat. In a natural fluid intake action, compression is performed in a traveling, peristaltic fashion. In order for the fluid intake action to be effective, it is desirable for the teat to be designed to allow formation of a reasonably leak-proof space for the fluid pocket. Hence, it is desirable to have a mechanism that prevents leakage from the fluid pocket and that prevents back flow of fluid when the fluid pocket is compressed. Ideally, the seal is such that it can travel with a traveling compression of the teat. Furthermore, the seal should be present at different deformation patterns of the fluid pocket.

The fluid pocket that is formed in a peristaltic fluid intake action does not only need to be sealable and compressible as explained in the foregoing, but should also allow for refilling from a back side before a next cycle of the peristaltic motion starts. In other words, the pocket needs to be dynamically sealed and opened at the back side. It is an object of the invention to provide a teat that allows for a process in which fluid pockets are created and moved forward in a continuous process during a fluid intake action, and that is designed to prevent decrease of effectiveness of the process due to back flow, while maintaining ease of assembly of the teat, good cleanability of the teat and other advantageous practical factors. In view thereof, the invention provides a teat as defined in the opening paragraph, wherein at least one of the interior surface of the mouthpiece and the exterior surface of the inner core has at least one protrusion that is configured and arranged to form a fluid barrier between the mouthpiece and the inner core at a position for delimiting the fluid duct at the sides thereof.

One of the insights underlying the invention is that a back flow of fluid does not only take place in a direction that may be denoted as being a backward direction, i.e. a direction from the at least one aperture of the mouthpiece to a base level of the teat, but also occurs when fluid is allowed to flow from the fluid duct in a sideward direction, i.e. a transverse, more or less peripheral direction with respect to a longitudinal direction in the teat, as in such a case, the fluid is capable of reaching areas where it can no longer be retained between the inner core and the mouthpiece and where there is nothing to stop a back flow of the fluid. It may be so that the tongue and the palate of an infant assist in creating a fluid pocket in the teat, but the sealing that is realized under the influence of pressure exerted by an infant appears not to be very effective on the sides of such a pocket. By providing at least one of the interior surface of the mouthpiece and the exterior surface of the inner core with at least one protrusion that is designed to provide a fluid seal of the fluid duct at the sides thereof, leakage of fluid from between the mouthpiece and the inner core at the position of the sides of the fluid pocket guiding face is prevented or at least largely hindered, so that the extent to which back flow of the fluid as a result of such leakage can take place is minimized.

Preferably, the at least one protrusion is configured and arranged to realize contact between the mouthpiece and the inner core through the at least one protrusion in a default, non-use condition of the teat. In particular, it may be so that in an assembly process of the teat, the at least one protrusion creates compression on the mouthpiece from inside of the mouthpiece, thereby ensuring effective sealing, which may be further enhanced under the influence of pressure exerted by an infant's tongue and palate during use of the teat. However, that does not alter the fact that the invention also covers a possibility that the designs of the mouthpiece and the inner core are such that a clearance is present between the mouthpiece and the inner core at the position of the at least one protrusion in the default, non-use condition of the teat, and that a sealing at the position of the protrusion is only achieved when the teat is in use and the mouthpiece is locally pressed in the direction of the inner core.

Within the framework of the invention, it is possible that contact between the inner core and the mouthpiece is only realized at the position of the at least one protrusion in the default, non-use condition of the teat. In such a case, the inner core and the mouthpiece have a clearance except at the position of the at least one protrusion, which facilitates assembly of the teat. However, the invention also covers embodiments of the teat in which a major portion of the exterior surface of the inner core lies against the interior surface of the mouthpiece, which portion of the exterior surface of the inner core may be as large as the portion other than the fluid pocket guiding face.

In the teat according to the invention, the fluid sealing functionality at the sides of the fluid duct may be realized by having at least one protrusion only on the interior surface of the mouthpiece, by having at least one protrusion only on the exterior surface of the inner core, or by having a combination of at least one protrusion on the interior surface of the mouthpiece and at least one protrusion on the exterior surface of the inner core.

In a practical embodiment of the teat according to the invention, the exterior surface of the inner core has two elongated protrusions, each protrusion extending alongside the fluid pocket guiding face. A direction in which the protrusions extend can be denoted as being a generally longitudinal direction in the teat. The invention also covers embodiments of the teat comprising a single protrusion that is generally U-shaped, the protrusion having elongated sections extending at both sides of the fluid pocket guiding face and being interconnected through another section making a turn at a front side of the inner core. In view of the functionality of preventing fluid leakage from the fluid duct at the two sides thereof as envisaged by the invention, use of a single protrusion having two elongated sections and use of two elongated protrusions that are not somehow interconnected are in fact similar measures. On the other hand, it is also possible for the teat to comprise more than two protrusions, wherein it is even possible for the interior surface of the mouthpiece and the exterior surface of the inner core to comprise patterns of discrete protrusion pieces, the protrusion pieces extending from the interior surface of the mouthpiece alternating with the protrusion pieces extending from the exterior surface of the inner core as seen in the longitudinal direction of the teat.

Preferably, in case the exterior surface has two elongated protrusions as mentioned in the foregoing, those elongated protrusions are arranged to extend along the entire length of the fluid pocket guiding face, so that a sealing effect as desired can be realized along the entire length of the fluid pocket guiding face. For the sake of clarity, it is noted that in the context of the present description, length is to be understood such as to be a dimension in the generally longitudinal direction of the teat.

Furthermore, the elongated protrusions may be designed so as to project from the fluid pocket guiding face in a generally sideward orientation with respect to the fluid pocket guiding face. In such a case, a situation in which the protrusions impact on an infant's tongue during a fluid intake action, which may be annoying to the infant, is avoided. That does not alter the fact that a design of the protrusions in which the protrusions project from the fluid pocket guiding face in a generally upright orientation with respect to the fluid pocket guiding face is possible as well within the framework of the invention.

It may be advantageous for the exterior surface of the inner core to be provided with elongated recesses extending alongside the elongated protrusions at a side of the protrusions facing away from the fluid pocket guiding face, as in such a case, the protrusions do not have an all too rigid arrangement, which is beneficial to the way an infant experiences the presence of the protrusions as rather hard elements of the teat.

In a practical embodiment of the teat according to the invention, the fluid pocket guiding face is at least one of an arced face and a recessed face of the exterior surface of the inner core. In respect of the possibility of the fluid pocket guiding face having an arced shape, it is noted that the fluid pocket guiding face may have a generally concave shape in that case. In respect of the additional or alternative possibility of the fluid pocket guiding face being provided in the form of a recessed face of the exterior surface of the inner core, it is noted that the fluid pocket guiding face may be recessed with respect to what would be an outline of the exterior surface for more or less following a peripheral shape of the mouthpiece in that case.

According to one feasible option, the teat according to the invention may comprise at least one valve means located within the mouthpiece at a level of the inner core, which valve means is configured and arranged to allow a fluid to flow through the fluid duct in one direction out of the teat and to resist a flow of fluid in the opposite direction, and which valve means will hereinafter be referred to as duct valve means. In a practical embodiment, the at least one duct valve means may comprise at least one deformable flange extending between the mouthpiece and the inner core. For example, it is possible for the at least one duct valve means to comprise at least one pair of deformable flanges which are configured and arranged to at least partially overlap in an undeformed condition of the flanges. In any case, by having valve means having a one-way valve functionality, back flow of fluid from the fluid duct is hindered or even totally prevented. A practical arrangement of the duct valve means is at a most backward level of the fluid duct. More than one duct valve means may be applied, in which case the respective duct valve means may be configured and arranged to divide the fluid duct in discrete sections. In such a case, it is achieved that during a peristaltic fluid intake action, fluid can only be advanced from one section of the fluid duct to another in the direction of the at least one aperture of the mouthpiece, so that back flow is avoided.

According to another feasible option, which may be combined with the above-mentioned option of having valve means located within the mouthpiece at a level of the inner core if so desired, the teat according to the invention may comprise at least one valve means located at a position outside of the fluid duct, which valve means is configured and arranged to allow a fluid to pass in a direction towards the at least one aperture of the mouthpiece and to resist a flow of fluid in the opposite direction, and which valve means will hereinafter be referred to as retainer valve means. For example, assuming that the teat comprises a main body from which the mouthpiece extends, the at least one retainer valve means may be located in such a main body. In a practical embodiment, the at least one retainer valve means may comprise at least one deformable flange. In any case, in a teat that is equipped with retainer valve means as mentioned, it is possible to ensure that fluid that has passed the retainer valve means is kept in the section of the teat that is between the retainer valve means and the at least one aperture of the mouthpiece. Hence, having the retainer valve means constitutes another measure aimed at preventing back flow in the teat, which is to be combined with the main measure of having the at least one protrusion on at least one of the interior surface of the mouthpiece and the exterior surface of the inner core as explained, for forming a fluid barrier at the sides of fluid pockets traveling along the fluid pocket guiding face during a fluid intake action, and possibly also with the measure of having the duct valve means.

In conformity with what is known from WO 2010/004487 A1, it is noted that the inner core may be removable from the mouthpiece. This may be beneficial in view of cleanability of the teat, which does not alter the fact that the invention also covers a teat in which the inner core is integrally formed with the mouthpiece. When it comes to realizing good cleanability of the teat, it may be so that the mouthpiece and any body from which it may extend are invertible, i.e., can be turned inside out. Furthermore, it is practical for the teat to comprise a support frame that is configured and arranged to support the inner core in the teat. The inner core may be realized in any suitable way and may comprise any suitable material or combination of materials. The inner core may include a hollow bore extending longitudinally therethrough for allowing for an additional flow of fluid, i.e., a fluid flow that can be obtained during use of the teat besides the fluid flow that is induced under the influence of a peristaltic tongue movement of an infant.

The invention also relates to an assembly that comprises a teat as described in the foregoing, i.e., a teat that is equipped with an inner core and a mouthpiece encompassing the inner core, and that comprises at least one elongated protrusion on at least one of the interior surface of the mouthpiece and the exterior surface of the inner core for delimiting a fluid duct between the mouthpiece and the inner core, and a container for containing a fluid.

The above-described and other aspects of the invention will be apparent from and elucidated with reference to the following detailed description of an embodiment of a teat comprising an inner core and a mouthpiece encompassing the inner core, which teat is designed to prevent back flow of fluid. Also, two possible additional measures for preventing back flow of fluid will be addressed.

BRIEF DESCRIPTION OF THE DRAWINGS

The invention will now be explained in greater detail with reference to the figures, in which equal or similar parts are indicated by the same reference signs, and in which.

DETAILED DESCRIPTION OF EMBODIMENTS

Figure 1:
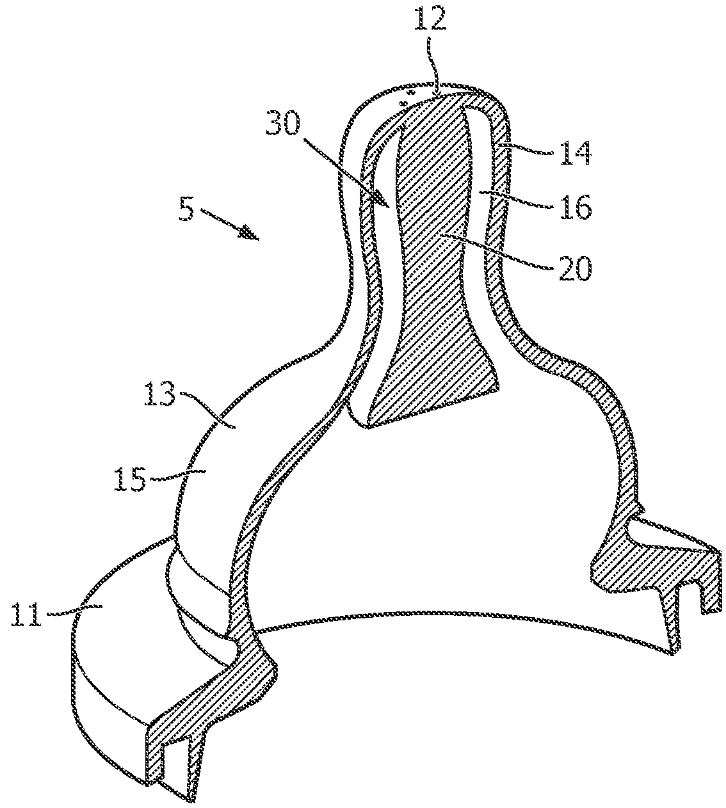
FIG. 1 diagrammatically shows a perspective sectional view of a teat according to a basic embodiment of the invention, which is designed to stimulate an infant to use a natural peristaltic fluid intake action for drawing fluid from the teat.
Figure 2:
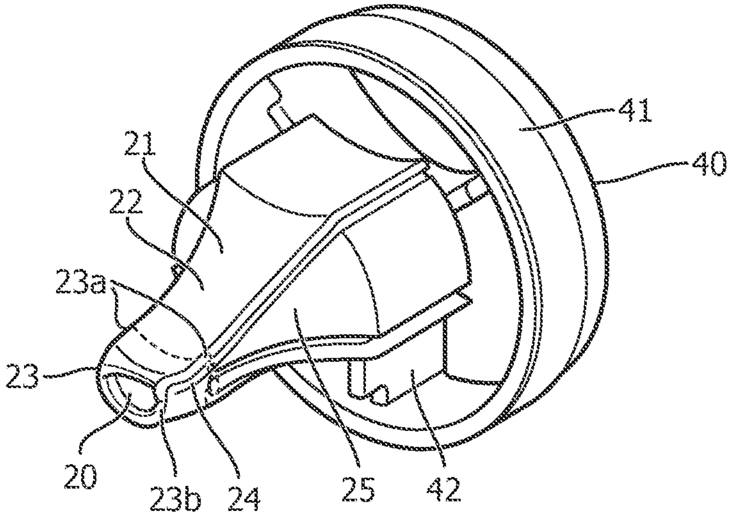
FIG. 2 diagrammatically shows a perspective view of a combination of an inner core and a support frame which are part of a teat according to a preferred embodiment of the invention.
Figure 3:
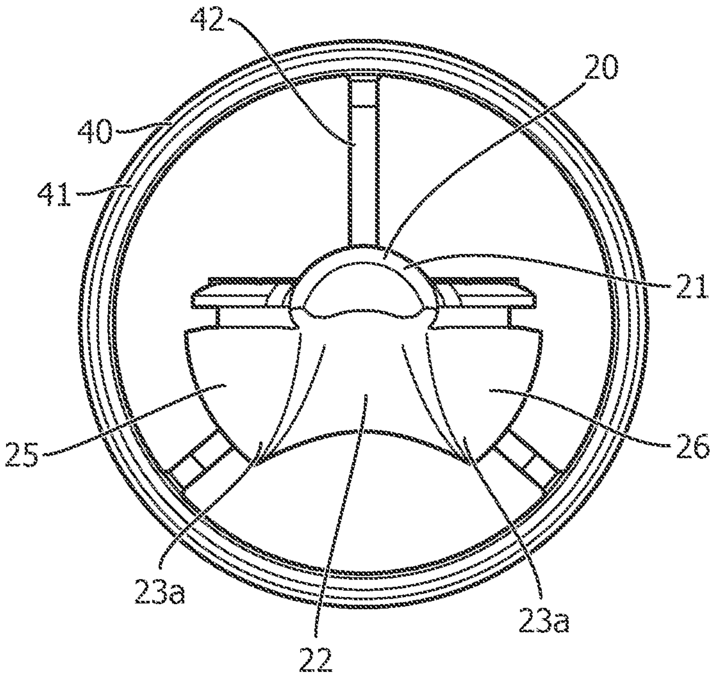
FIG. 3 diagrammatically shows a front view of the combination of the inner core and the support frame.
Figure 4:
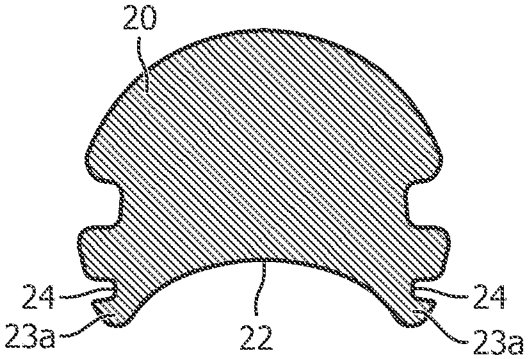
FIG. 4 diagrammatically shows a cross-sectional view of the inner core, for example as taken at the broken line shown in FIG. 2.

FIG. 1 shows a perspective sectional view of a teat 5 according to a basic embodiment of the invention, which is designed to stimulate an infant to use a natural peristaltic fluid intake action for drawing fluid from the teat 5. In the following description, it is assumed that the fluid is milk, which should not be understood so as to mean that the use of the teat 5 is restricted to this particular type of fluid. In this respect, it is noted that other examples of fluid that may be supplied to an infant by means of the teat are water, porridge-like fluid, and medicinal fluid.

Like any conventional teat, the teat 5 according to the invention is intended to be connected to a container (not shown in FIG. 1) which is suitable for containing an amount of fluid to be supplied to an infant, and which may be of any design and type. For example, the teat 5 may be used in combination with a feeding bottle that is provided with external screw thread at an open side thereof and a connecting ring that is provided with internal screw thread, in which case a flange-like portion 11 of the teat 5 can be retained between the connecting ring and the bottle in an interconnected condition of the connecting ring and the bottle that is realized by engagement of the respective screw threads. The teat 5 has at least one aperture 12 for letting out milk from the teat 5. In the shown example, the number of apertures 12 is three. In the present description, terms such as front, back, forward, and backward are to be understood so as to be related to a normal flow of milk through the teat 5, as intended to be supplied to an infant, i.e., a flow of milk in a direction from the flange-like portion 11 to the at least one aperture 12.

The teat 5 comprises a hollow, flexible outer membrane 13 basically having two portions, namely a mouthpiece 14 and a main body 15. The mouthpiece 14 extends from the main body 15, wherein the mouthpiece 14 comprises the at least one aperture 12 as mentioned earlier at a forward side thereof, and wherein the main body 15 comprises the flange-like portion 11 as mentioned earlier at a backward side thereof. An inner core 20 that comprises a substantially cylindrical plug in the shown example is disposed within the mouthpiece 14. In this configuration, a fluid duct 30 is defined between the mouthpiece 14 and the inner core 20 for accommodating a flow of milk that is directed towards the at least one aperture 12 for the purpose of supplying the milk to an infant during use of the teat 5. A portion of the inner core 20 may project from the mouthpiece 14 in a backward direction, extending into the main body 15.

Operation of the basic embodiment of the teat 5 according to the invention will now be described. In use, the teat 5 is connected to a feeding bottle or the like, as explained earlier. The infant sucks on the mouthpiece 14 which is sufficient to realize an initial, small flow of milk from the feeding bottle into the fluid duct 30. However, in order to obtain a full flow of milk from the feeding bottle out of the teat 5, the infant must perform a peristaltic fluid intake action by which a wave of compression is exerted by the infant's tongue on the mouthpiece 14, in a direction towards the forward side of the mouthpiece 14. In the process, the mouthpiece 14 deforms, and the fluid duct 30 is locally compressed by the infant's tongue, at successive levels of the fluid duct in the direction as mentioned, so that a milk-filled pocket is pressed forward through the fluid duct 30. When the milk-filled pocket is at the forward side of the mouthpiece 14, the milk is expelled out of the at least one aperture 12 into the infant's mouth. The infant then repeats the peristaltic fluid intake action, commencing at the backward side, i.e., the main body side of the mouthpiece 14. By repeating the peristaltic fluid intake action over and over again, continuous fluid intake is realized.

According to the invention, as explained earlier, the teat 5 is configured so that the peristaltic fluid intake action provides the infant with the most amount of milk, compared to if the infant was to use a sucking or a chewing action. Accordingly, the infant is rewarded for using the same fluid intake action as with natural breast feeding, and so the problem of nipple confusion in switching between bottle feeding and breast feeding is prevented since the infant learns to use the same fluid intake action for both fluid intake methods.

In order to facilitate cleaning of the teat 5 as shown in FIG. 1, the inner core 20 may be removable from the membrane 13. This may particularly be achievable by turning the membrane 13 inside out and cleaning the membrane 13 separately from the inner core 20.

In a general sense, it will be appreciated that a peristaltic fluid intake action essentially involves locally closing a duct in which fluid is contained, thereby forming a fluid-filled pocket, and moving the fluid-filled pocket in the direction of the at least one aperture 12 for expelling the fluid from the teat 5, by moving the position of the local closure.

FIGS. 2-5 relate to a teat 10 according to a preferred embodiment of the invention. The general set-up of the teat 10 according to the preferred embodiment of the invention is the same as the set-up of the teat 5 according to the basic embodiment of the invention, and the information provided in the foregoing with respect to the basic embodiment is equally applicable to the preferred embodiment. Particulars of the preferred embodiment as shown are that the inner core 20 is supported on a support frame 40 that is arranged at the level of the main body 15, which comprises a ring 41 and a number of spokes 42 in the shown example, and that an exterior surface 21 of the inner core 20 is provided with an arced face that extends along a length of the inner core 20 and that is referred to as fluid pocket guiding face 22 in view of the fact that it serves for delimiting the fluid duct 30 at the side of the inner core 20 and thereby serves for guiding fluid pockets on the exterior surface 21 of the inner core 20 during a fluid intake action. The fluid pocket guiding face 22 is intended to be at a bottom side of the teat 10 when the teat 10 is used in a fluid intake action, so that an infant can make a peristaltic tongue movement on the mouthpiece 14, thereby locally pressing the mouthpiece 14 in the direction of the fluid pocket guiding face 22 at successive levels of the inner core 20. The fluid pocket guiding face 22 preferably has a generally concave shape, as is the case in the shown example, and is recessed with respect to what would be an outline of the exterior surface 21 for more or less following the circular or elliptical peripheral shape of the mouthpiece 14.

Figure 5:
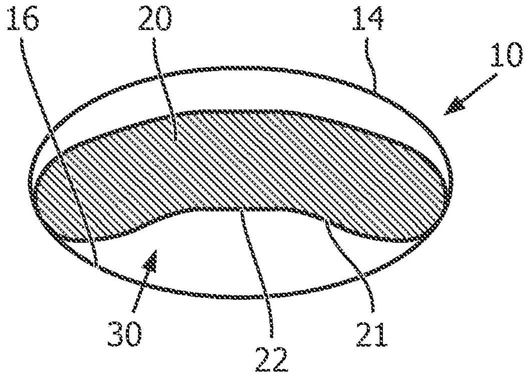
FIG. 5 illustrates how a fluid pocket is sealed at the sides thereof during use of the teat.

FIG. 5 provides a sectional view of the inner core 20 as surrounded by the mouthpiece 14 and clearly shows the fluid duct 30 that is present between the inner core 20 and the mouthpiece 14 at the position of the fluid pocket guiding face 22. Particularly, the fluid duct 30 is delimited by a portion of the exterior surface 21 of the inner core 20 and a portion of an interior surface 16 of the mouthpiece 14, which surface portions contact each other along longitudinal edges of the fluid pocket guiding face 22. When a milk-filled pocket is advanced through the fluid duct 30, the milk-filled pocket is sealed to the sides thereof at the positions of the longitudinal edges of the fluid pocket guiding face 22, which implies a sealing of the milk-filled pocket in a peripheral direction of the teat 10, i.e., a direction around a longitudinal axis of the teat 10 along the exterior surface 21 of the inner core 20.

According to the invention, in order to ensure proper and effective sealing, the exterior surface 21 of the inner core 20 is provided with a protrusion 23 comprising two elongated sections **23*a* extending along both longitudinal edges of the fluid pocket guiding face 22 and a curved section 23*b* interconnecting the elongated sections 23*a* at a front side of the inner core 20. In particular, in the shown embodiment, as can best be seen in FIGS. 2 and 4, each of the elongated sections 23*a* of the protrusion 23 extends at a side of the fluid pocket guiding face 22 for contacting the interior surface 16 of the mouthpiece 14 and thereby closing the fluid duct 30 at the sides thereof. Words that may be used in practice to denote the protrusion 23 include "ridge" and "rib". In the shown example, contact between the mouthpiece 14 and the inner core 20 is established along the elongated sections 23*a* of the protrusion 23 only, wherein it is to be noted that this is not essential within the framework of the invention. It is preferred for the exterior surface 21 of the inner core 20 to be provided with elongated recesses 24 extending alongside the elongated sections 23*a* of the protrusion 23 at a side of the elongated sections 23*a* facing away from the fluid pocket guiding face 22, as is the case in the shown example, so as to have an arrangement of the elongated sections 23*a* on the inner core 20 that is somewhat flexible. In any case, on the basis of the presence of the protrusion 23 on the inner core 20, leakage of milk from the fluid duct 30 in a sideward direction is prevented, so that a back flow of milk is prevented, which might otherwise occur if milk would be allowed to flow between the inner core 20 and the mouthpiece 14 at the position of portions 25, 26 of the inner core 20 adjoining the fluid pocket guiding face 22** at either side thereof.

The presence of the curved section **23*b* of the protrusion 23 is not essential, and the elongated sections 23*a* may also be provided as two separate protrusions of the exterior surface 21 of the inner core 20. The above description of the functionality of the protrusion 23** is equally applicable to such a case.

Figure 6:
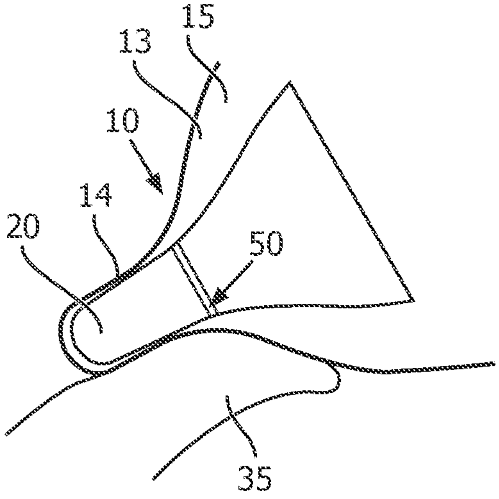
FIGS. 6 and 7 relate to a possibility according to which the teat according to the invention is equipped with valve means having a first positioning in the teat.
Figure 7:
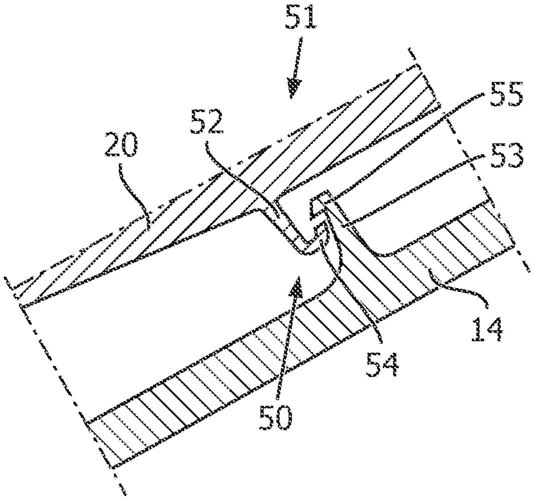
Figure 8:
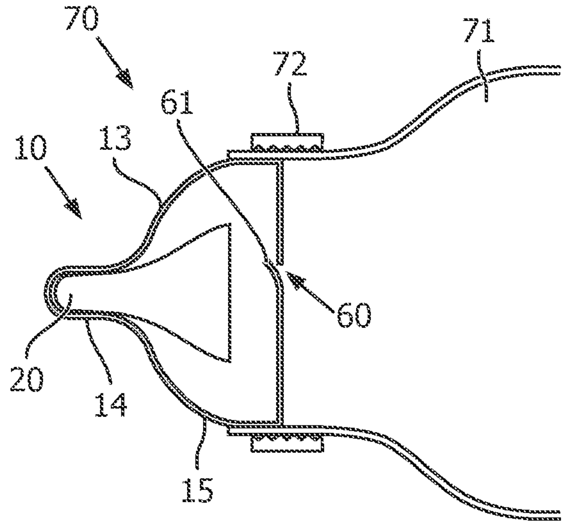
FIG. 8 relates to a possibility according to which the teat according to the invention is equipped with valve means having a second positioning in the teat.

FIGS. 6-8 relate to further measures which may be taken in order to prevent back flow of milk, i.e., flow of milk in a backward direction, which is a direction back into a container such as a feeding bottle during actual use of the teat 10. FIG. 6 diagrammatically shows a side view of the teat 10 and an infant's tongue 35 contacting the teat 10. In the figure, a valve means that is present at a most backward level of the fluid duct 30 in the shown example, and which is referred to as duct valve means 50, is illustrated. For the sake of clarity, the support frame 40 is not shown in FIG. 6. In general, at least one duct valve means 50 that is arranged between the mouthpiece 14 and the inner core 20 may be used in the teat 10. Assuming that the duct valve means 50 is configured and arranged to be open to milk in a forward direction and to be closed to milk in a backward direction, i.e., to act like a one-way valve that is openable in a forward direction only, the duct valve means 50 is effective in preventing back flow of milk. Thus, when the duct valve means 50 is applied, a flow of milk from the fluid duct 30 at the back side of the fluid duct 30 is prevented, while a flow of milk from the fluid duct 30 at the sides of the fluid duct 30 is prevented as well as explained in the foregoing, so that the only direction in which milk is allowed to travel is a forward direction, towards the at least one aperture 12 of the mouthpiece 14.

FIG. 7 shows a detail of the duct valve means 50 and thereby illustrates a possible embodiment of the duct valve means 50. In the shown example, the duct valve means 50 comprises a pair 51 of deformable flanges 52, 53, one flange 52 extending from the inner core 20 towards the mouthpiece 14, and another flange 53 extending from the mouthpiece 14 towards the inner core 20. The flanges 52, 53 are configured and arranged to partially overlap in an undeformed condition thereof, even engage each other at hook-shaped edges 54, 55 thereof, so that a closed condition of the duct valve means 50 is a default condition of the duct valve means 50. Only when pressure is exerted, particularly pressure acting in a forward direction, the flanges 52, 53 are deformed and a space between the flanges 52, 53 for milk to flow through is obtained between the flanges 52, 53. In case pressures are prevailing which are potentially capable of causing a back flow of milk in the fluid duct 30, the duct valve means 50 remains closed and the milk cannot be moved, the closed condition of the duct valve means 50 being supported by a presence of an amount of milk right behind the duct valve means 50. Relative widths of the flanges 52, 53 may be chosen differently from what is illustrated in FIG. 7 so as to have the flanges 52, 53 predominantly on one of the mouthpiece 14 and the inner core 20.

FIG. 8 relates to a possibility according to which the teat 10 is equipped with valve means which may be arranged at any suitable position outside of the fluid duct 30, for example, at a position in the main body 15 as is the case in the shown example, and which is referred to as retainer valve means 60. For the sake of clarity, the support frame 40 is not shown in FIG. 8. Like the duct valve means 50, the retainer valve means 60 may be designed to act like a one-way valve and thereby may be suitable to prevent back flow of milk. The retainer valve means 60 may be of any suitable design, probably comprising at least one deformable flange 61 as illustrated. In fact, valve means like the retainer valve means 60 may be present at any suitable position in an assembly 70 as partially shown in FIG. 8, which is an assembly 70 of a teat 10, a feeding bottle 71 and possibly also a connecting ring 72. For example, a position in the feeding bottle 71 is feasible for such valve means.

The use of the duct valve means 50 and/or the use of the retainer valve means 60 and/or similar valve means may especially be advantageous when in practical situations there appears to be a need to compensate for limitations on feasibility and/or extent of implementation of the main concept of having at least one protrusion 23 for establishing contact between the mouthpiece and the inner core, at least during a fluid intake action, and thereby preventing a back flow of fluid through preventing leakage of milk from the fluid duct 30 at the sides thereof.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details that are not required for understanding the invention may have been omitted, and not necessarily to scale.

Variations to the disclosed embodiments can be understood and effected by a person skilled in the art in practicing the claimed invention, from a study of the figures, the description, and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The term "comprise" as used in this text will be understood by a person skilled in the art as covering the term "consist of". Hence, the term "comprise" may in respect of an embodiment mean "consist of", but may in another embodiment mean "contain/include at least the defined species and optionally one or more other species".

In case the teat 10 according to the invention is of the type that can be disassembled, which is the case when the inner core 20 is removable from the mouthpiece 14, for example, the teat 10 is within the scope of the invention in any possible condition thereof, particularly an assembled condition or a disassembled condition.

As explained in the foregoing, in the teat 10 according to the invention, the at least one protrusion 23 that is present on at least one of the interior surface 16 of the mouthpiece 14 and the exterior surface 21 of the inner core 20 is configured and arranged to form a fluid barrier between the mouthpiece 14 and the inner core 20 at a position for delimiting the fluid duct 30 at the sides thereof. In this respect, it is noted that the term "protrusion" should be understood for its commonly known meaning of something that protrudes, projects, or extends from a surrounding surface area, i.e., something that sticks out from a surrounding surface area. A protrusion may be provided on the respective surface 16, 21 as a rib, ridge, protuberance, bulge, locally thickened portion, locally raised portion, etc.

Summarizing, a teat 10 for use with a container 71 for containing a fluid comprises a deformable mouthpiece 14 for an infant to suck on during a fluid intake action and an inner core 20 disposed within the mouthpiece 14. An exterior surface 21 of the inner core 20 is spaced from an interior surface 16 of the mouthpiece 14 at the position of a fluid pocket guiding face 22 of the exterior surface 21 of the inner core 20 so that a fluid duct 30 between the mouthpiece 14 and the inner core 20 is defined which allows the infant to perform a peristaltic fluid intake action. At least one of the interior surface 16 of the mouthpiece 14 and the exterior surface 21 of the inner core 20 has at least one protrusion 23 that is designed to form a fluid barrier between the mouthpiece 14 and the inner core 20 at a position for delimiting the fluid duct 30 at the sides thereof. In that way, proper sealing of the fluid duct 30 along the sides thereof is ensured and back flow of fluid is prevented.

The invention claimed is:

1. A teat for use with a container for containing a fluid, comprising a deformable mouthpiece for an infant to suck on during a fluid intake action, the mouthpiece having at least one aperture therein for allowing the fluid to flow out of the teat;

an inner core disposed within the mouthpiece; and at least one valve means located within the mouthpiece at a level of the inner core, wherein the at least one valve means is configured to allow the fluid to flow through a fluid duct in one direction out of the teat and to resist a flow of fluid in an opposite direction, wherein an exterior surface of the inner core is spaced from an interior surface of the mouthpiece at a position of a fluid pocket guiding face of the exterior surface of the inner core extending along a length of the inner core so that the fluid duct between the mouthpiece and the fluid pocket guiding face is defined, allowing the infant to perform a peristaltic fluid intake action during which the mouthpiece is deformed and the fluid is forced along the fluid duct in a direction towards the at least one aperture of the mouthpiece, and wherein at least one of the interior surface of the mouthpiece or the exterior surface of the inner core has at least one protrusion that is configured to form a fluid barrier between the mouthpiece and the inner core at a position for delimiting the fluid duct at sides thereof, such that the fluid barrier is configured to prevent leakage of the fluid from between the mouthpiece and the inner core at sides of the fluid pocket guiding face, thus sealing the fluid duct in a sideward direction, whereby the fluid follows a path of travel along the fluid pocket guiding face during use.

2. The teat according to claim 1, wherein the at least one protrusion is configured to realize contact between the mouthpiece and the inner core through the at least one protrusion in a default, non-use condition of the teat.

3. The teat according to claim 1, wherein the at least one protrusion comprises two elongated protrusions, each elongated protrusion extending alongside the fluid pocket guiding face.

4. The teat according to claim 3, wherein the two elongated protrusions extend along an entire length of the fluid pocket guiding face.

5. The teat according to claim 3, wherein the two elongated protrusions project from the fluid pocket guiding face in a generally sideward orientation with respect to the fluid pocket guiding face.

6. The teat according to claim 3, wherein the exterior surface of the inner core defines elongated recesses extending alongside the two elongated protrusions.

7. The teat according to claim 1, wherein the at least one protrusion further comprises a curved section interconnecting the at least one protrusion extending along the at least one edge of the fluid pocket guiding face at a front side of the inner core.

8. The teat according to claim 1, wherein the at least one valve means comprises at least one deformable flange extending between the mouthpiece and the inner core.

9. The teat according to claim 1, further comprising at least one valve means located at a position outside of the fluid duct, wherein the at least one valve means is configured to allow the fluid to pass in a direction towards the at least one aperture of the mouthpiece and to resist a flow of fluid in the opposite direction.

10. The teat according to claim 9, further comprising a main body from which the mouthpiece extends, wherein the at least one valve means is located in the main body.

11. The teat according to claim 9, wherein the at least one valve means comprises at least one deformable flange.

12. The teat according to claim 1, wherein the inner core is removable from the mouthpiece.

13. The teat according to claim 1, further comprising a support frame configured to support the inner core in the teat.

14. The teat according to claim 1, wherein a front side of the inner core contacts a tip of the mouthpiece adjacent to the at least one aperture.

15. An assembly comprising the teat according to claim 1 and a container for containing the fluid.

16. A teat for use with a container for containing a fluid, the teat comprising:

a deformable mouthpiece for an infant to suck on during a fluid intake action, the mouthpiece defining at least one aperture for allowing the fluid to flow out of the teat:

an inner core disposed within the mouthpieces wherein an exterior surface of the inner core comprises a single fluid pocket guiding face that is spaced from an interior surface of the mouthpiece and extends along a length of the inner core so that a fluid duct between the mouthpiece and the fluid pocket guiding face is defined which allows the infant to perform a peristaltic fluid intake action during which the mouthpiece is deformed and the fluid is forced along the fluid duct in a direction towards the at least one aperture of the mouthpiece, and at least one valve located within the mouthpiece at a level of the inner core, and configured to allow the fluid to flow through the fluid duct in one direction out of the teat and to resist a flow of fluid in the opposite direction, wherein at least one of the interior surface of the mouthpiece or the exterior surface of the inner core has protrusions at least at edges of the fluid pocket guiding face and configured to form a fluid barrier between the mouthpiece and the inner core at a position for delimiting the fluid duct at sides thereof, such that the fluid harrier is configured to prevent leakage of the fluid from between the mouthpiece and the inner core at the edges of the fluid pocket guiding face, thus sealing the fluid duct in a sideward direction, whereby the fluid follows a path of travel along the fluid pocket guiding face during use.

17. The teat according to claim 16, wherein the protrusions comprise a curved section interconnecting the protrusions at the edges of the fluid pocket guiding face at a front side of the inner core.

18. The teat according to claim 16, further comprising at least one valve located at a position outside of the fluid duct, wherein the valve is configured to allow the fluid to pass in a direction towards the at least one aperture of the mouthpiece and to resist a flow of fluid in the opposite direction, and wherein the at least one valve comprises a deformable flange.

* * * * *